United States Patent
Aggarwal et al.

(10) Patent No.: US 8,527,685 B2
(45) Date of Patent: Sep. 3, 2013

(54) FIRMWARE-DRIVEN MULTIPLE VIRTUAL SAS EXPANDERS ON A SINGLE EXPANDER HARDWARE COMPONENT

(75) Inventors: Kaushalender Aggarwal, Pune (IN); Saurabh B. Khanvilkar, Pune (IN); Mandar D. Joshi, Pune (IN)

(73) Assignee: LSI Corporation, San Jose, CA (US)

( * ) Notice: Subject to any disclaimer, the term of this patent is extended or adjusted under 35 U.S.C. 154(b) by 287 days.

(21) Appl. No.: 13/157,663

(22) Filed: Jun. 10, 2011

(65) Prior Publication Data

US 2012/0317324 A1    Dec. 13, 2012

(51) Int. Cl.
*G06F 13/00*    (2006.01)
*G06F 13/36*    (2006.01)

(52) U.S. Cl.
USPC ............ 710/300; 710/311; 710/312; 710/313

(58) Field of Classification Search
USPC .......................................... 710/300, 311–313
See application file for complete search history.

(56) References Cited

U.S. PATENT DOCUMENTS

| | | | |
|---|---|---|---|
| 7,668,925 B1 * | 2/2010 | Liao et al. ..................... | 709/212 |
| 7,849,248 B2 | 12/2010 | Johnson et al. | |
| 7,882,281 B2 | 2/2011 | Jones et al. | |
| 8,171,176 B2 * | 5/2012 | Battacharya et al. ............ | 710/2 |
| 8,255,607 B2 * | 8/2012 | Jones et al. ................... | 710/316 |
| 8,352,653 B2 * | 1/2013 | Fang et al. ..................... | 710/74 |
| 8,402,196 B2 * | 3/2013 | Davis et al. ................... | 710/313 |
| 2012/0191886 A1 * | 7/2012 | Ballard et al. ................ | 710/106 |

* cited by examiner

*Primary Examiner* — Brian Misiura
(74) *Attorney, Agent, or Firm* — Suiter Swantz pc llo

(57) ABSTRACT

The present invention is directed to a method for implementing firmware in an expander system in such a way that a single hardware component (ex.—a chip) of the expander system may be presented as multiple virtual expanders to both upstream connected devices (ex.—HBAs) as well as downstream connected devices (ex.—disk drives).

14 Claims, 2 Drawing Sheets

| Virtual Expander | Logical Phy ID | Physical Phy ID |
|---|---|---|
| A | 0 | 0 |
| A | 1 | 1 |
| A | 2 | 2 |
| A | 3 | 3 |
| B | 0 | 4 |
| B | 1 | 5 |
| B | 2 | 6 |
| B | 3 | 7 |

# FIRMWARE-DRIVEN MULTIPLE VIRTUAL SAS EXPANDERS ON A SINGLE EXPANDER HARDWARE COMPONENT

FIELD OF THE INVENTION

The present invention relates to the field of data management via data storage systems and particularly to a system (ex.—expander system) and method for providing firmware-driven multiple virtual Serial Attached Small Computer System Interface (SAS) expanders on a single expander hardware component (exs.—via a single expander hardware component; via a single expander chip).

BACKGROUND OF THE INVENTION

Currently available expanders may not provide a desired degree of flexibility for connection with devices such as Host Bus Adapter(s) (HBA(s)).

Therefore, it may be desirable to provide an expander system and/or method for providing an expander system which addresses the above-referenced shortcomings of currently available solutions.

SUMMARY OF THE INVENTION

Accordingly, an embodiment of the present disclosure is directed to a method for providing firmware-driven multiple virtual expanders on a single expander hardware component via an expander system (ex.—a SAS expander system/SAS expander), said method including: receiving a request (ex.—a SMP request) at the expander system from a connected device (ex.—a HBA or disk drive); comparing, via the hardware component, an address of the received request to at least one of: a first address of the expander system and a second address of the expander system to determine if the received request is addressed to the expander system, a first physical phy of the hardware component being pre-programmed with the first address, a second physical phy of the hardware component being pre-programmed with the second address, the second address being different than the first address, thereby causing the hardware component to be presented to the connected device as a first virtual expander having the first address and a second virtual expander having the second address; when the hardware component determines that the received request is addressed to the expander system, generating an interrupt via the hardware component and invoking a registered handler of a firmware component of the expander system via the hardware component; checking, via the registered handler, Open Address Frame information corresponding to the received request; and processing the received request, via the registered handler, based upon said checking of the Open Address Frame information, wherein said processing includes: 1) selecting either a first request handler or a second request handler, the first request handler being configured for processing requests addressed to the first virtual expander, the second request handler being configured for processing requests addressed to the second virtual expander; 2) calling the selected request handler; and 3) routing the received request to the selected request handler. The method further includes processing the received request via the selected request handler.

A further embodiment of the present disclosure is directed to a non-transitory, computer-readable medium having computer-executable instructions for performing a method for providing firmware-driven multiple virtual expanders on a single expander hardware component via an expander system, said method including: receiving a request at the expander system from a connected device; comparing, via the hardware component, an address of the received request to at least one of: a first address of the expander system and a second address of the expander system to determine if the received request is addressed to the expander system, a first physical phy of the hardware component being pre-programmed with the first address, a second physical phy of the hardware component being pre-programmed with the second address, the second address being different than the first address, thereby causing the hardware component to be presented to the connected device as a first virtual expander having the first address and a second virtual expander having the second address; when the hardware component determines that the received request is addressed to the expander system, generating an interrupt via the hardware component and invoking a registered handler of a firmware component of the expander system via the hardware component; checking, via the registered handler, Open Address Frame information corresponding to the received request; and processing the received request, via the registered handler, based upon said checking of the Open Address Frame information, wherein said processing includes: 1) selecting either a first request handler or a second request handler, the first request handler being configured for processing requests addressed to the first virtual expander, the second request handler being configured for processing requests addressed to the second virtual expander; 2) calling the selected request handler; and 3) routing the received request to the selected request handler. The method further includes processing the received request via the selected request handler.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figure(s) in which.

DETAILED DESCRIPTION OF THE INVENTION

Figures 1, 2:
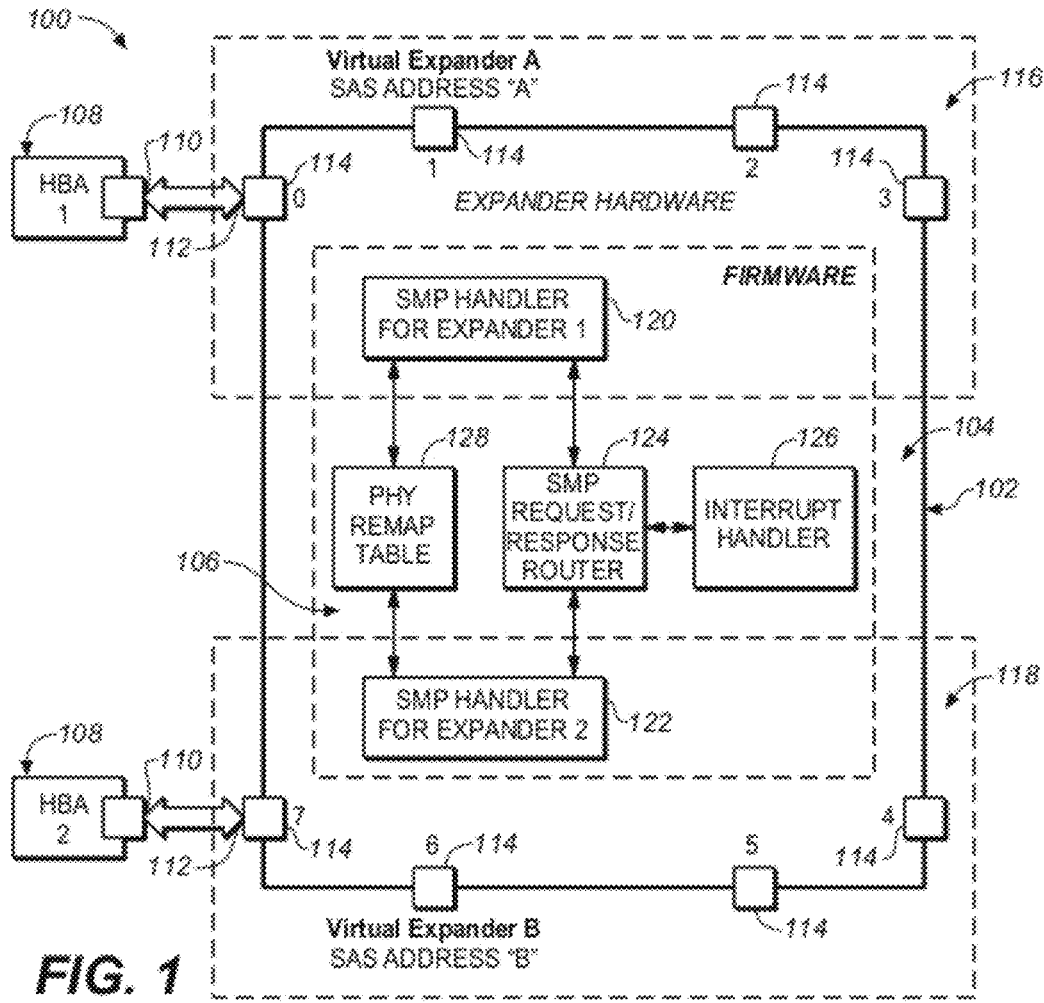
FIG. 1 is a block diagram illustration of a SAS topology including an expander system for providing firmware-driven multiple virtual Serial Attached Small Computer Systems Interface (SAS) expanders on a single expander hardware component (exs.—via a single expander hardware component; via a single expander chip), in accordance with exemplary embodiments of the present disclosure.
FIG. 2 is a phy-remapping table for the expander system of FIG. 1, in accordance with an exemplary embodiment of the present disclosure.

Reference will now be made in detail to the presently preferred embodiments of the invention, examples of which are illustrated in the accompanying drawings.

A Serial Attached Small Computer System Interface (SAS) expander typically supports the following protocols: Serial Management Protocol (SMP) (ex.—target function and/or initiator function); Serial Small Computer System Interface Protocol (SSP) (ex.—target function and/or initiator function); and Serial Advanced Technology Attachment Tunneled Protocol (STP) (ex.—initiator function). For a SAS expander, supporting the SMP target function is mandatory. Without being able to support the SMP target function, an expander, when placed in a SAS topology, cannot be discovered. A SMP target represents a SAS expander. Therefore, the system of the present disclosure, by supporting multiple SMP targets on a single expander hardware component (exs.—via a single expander hardware component; via a single expander chip), achieves creation of multiple virtual expanders. Usually expanders are available with a fixed port count. However, there may be a need to connect single or multiple Host Bus Adapters (HBAs) to multiple, lesser port count expanders. The expander system of the present disclosure allows for a single expander (exs.—a single expander hardware component; a single expander chip) to be used and/or presented as multiple, independent, lesser port count expanders.

During a typical SAS Discovery process, when a SAS expander is connected in a SAS topology (ex.—connected to a HBA), or when an existing SAS topology is powered-up, SAS IDENTIFY address frames are exchanged between all connected ports. Through such exchange process, a HBA is able to determine that a SMP target (ex.—a SAS expander) having a certain SAS address is connected to it. Typically, every physical phy of the expander has an IDENTIFY register set (ex.—IDENTIFY registers). The IDENTIFY registers of the IDENTIFY register set are programmed with the SAS address (ex.—the IDENTIFY SAS address) of the SMP target. For instance, the SAS address programmed in the IDENTIFY registers of all physical phys of an expander is the expander's SMP Target SAS address. This SMP Target SAS address is the address which connected devices may use for performing management functions (ex.—SAS Discovery) on the expander. The present disclosure discloses system(s) and method(s) for presenting a single SAS expander (exs.—a single SAS expander hardware component; a single SAS expander chip) as multiple and different virtual SAS expanders to both upstream connected devices (ex.—HBAs) and downstream connected devices (ex.—disk drives). The system(s) and method(s) of the present disclosure may provide the following advantages over currently implemented SAS systems/methods: reduction in cost; reduction in hardware required; reduction in power usage; reduction in space required in the system; simple board layout; no interoperability issues due to single hardware and firmware; and less debug efforts.

Referring to FIG. 1, a topology (ex.—a SAS topology) including an expander system for providing firmware-driven multiple virtual Serial Attached Small Computer Systems Interface (SAS) expanders on a single expander hardware component (exs.—via a single expander hardware component, on a single expander chip) in accordance with an exemplary embodiment of the present disclosure is shown. In exemplary embodiments of the present disclosure, the topology 100 may include an expander system 102 (ex.—an expander 102). For example, the expander 102 may be a SAS expander 102. The SAS expander 102 may include hardware/a hardware component 104 (ex.—a chip). The SAS expander 102 may further include firmware/a firmware component 106. The firmware component 106 of the expander 102 may be connected to (ex.—communicatively coupled with) the hardware component 104 of the expander 102.

In further embodiments of the present disclosure, the topology 100 includes one or more devices 108. The devices 108 may be configured for being connected to the SAS expander 102 in the SAS topology 100. For example, the devices 108 may be upstream connected devices, such as HBAs (as shown in FIG. 1), or, in further embodiments, the devices 108 may be downstream connected devices, such as disk drives, or in still further embodiments, the devices 108 may be downstream or upstream connected devices, such as expanders. For example, in further exemplary topology embodiments, one or more expanders may be connected between SAS expander 102 and an HBA (ex.—the one or more expanders may be connected upstream from SAS expander 102). In still further exemplary topology embodiments, one or more expanders may also be connected between SAS expander 102 and disk drive(s) (ex.—the one or more expanders may be connected downstream from SAS expander 102). In exemplary embodiments of the present disclosure, each of the devices 108 may include one or more ports 110. Further, the expander hardware component 104 may include a plurality of ports 112. A port 110 of each device 108 may be connected to corresponding ports 112 of the expander hardware component 104.

In exemplary embodiments of the present disclosure, the expander hardware component 104 includes a plurality of physical phys 114. Each of the physical phys 114 may be connected to a corresponding port included in the plurality of ports 112 of the expander hardware component 104. Further, each of the physical phys 114 may include a plurality of registers (exs.—an IDENTIFY register set; IDENTIFY registers).

In further embodiments of the present disclosure, registers (ex.—IDENTIFY registers) of a first portion (ex.—half) of the physical phys included in the plurality of physical phys 114 of the expander hardware component 104 may be programmed with a first address (ex.—SAS address "A"). Further, registers (ex.—IDENTIFY registers) of a second portion (ex.—the remaining half) of the physical phys included in the plurality of physical phys 114 of the expander hardware component 104 may be programmed with a second address (ex.—SAS address "B"), the second address being a different address than the first address. By programming the registers of the physical phys 114 of the expander hardware component with the different addresses (ex.—SAS address "A" and SAS address "B"), the single hardware component 104 of the expander 102 may be presented as multiple expanders (ex.—two or more virtual expanders) to the connected devices 108. For instance, programming the first portion (ex.—first half) of the physical phys included in the plurality of physical phys 114 with the first address (ex.—SAS address "A") creates a first virtual expander 116 (exs.—virtual expander "A"; virtual SAS expander "A") of expander system 102, while programming the second portion (ex.—second half) of the physical phys included in the plurality of physical phys 114 with the second address (ex.—SAS address "B") creates a second virtual expander 118 (exs.—virtual expander "B"; virtual SAS expander "B") of expander system 102. In further embodiments, the first address (ex.—SAS address "A") may be an SMP target SAS address for the first virtual expander 116 (ex.—virtual expander "A"), said first virtual expander 116 being a first SMP target (ex.—SMP target "A"). In still further embodiments, the second address (ex.—SAS address "B") may be an SMP target SAS address for the second virtual expander 118 (ex.—virtual expander "B"), said second virtual expander 118 being a second SMP target (ex.—SMP target "B").

In exemplary embodiments of the present disclosure, the expander system 102 includes (ex.—the firmware component 106 of the expander system 102 includes) a first request handler 120 (ex.—a first request processor 120) and a second request handler 122 (ex.—a second request processor 122). The first request handler 120 (exs.—first SMP request handler; first SMP handler) may be configured for handling (ex.—processing) requests (ex.—SMP requests) which are directed to the first virtual expander 116. The second request handler 122 (exs.—second SMP request handler; second SMP handler) may be configured for handling (ex.—processing) requests (ex.—SMP requests) which are directed to the second virtual expander 118. Collectively, the first SMP request handler 120 and the second SMP request handler 122 form a callback registration mechanism in the firmware 106. For example, a first callback function (ex.—smpFunctionA( )) may be registered for virtual expander "A" 116, while a second callback function (ex.—smpFunctionB( ) may be registered for virtual expander "B" 118. In exemplary embodiments, smpFunctionA( ) (ex.—the first SMP handler 120) may be written specifically to handle SMPs for virtual expander "A" 116, while smpFunctionB( ) (ex.—the second SMP handler 122) may be written specifically to handle SMPs for virtual expander "B" 118.

In further embodiments of the present disclosure, the expander system 102 includes (ex.—the firmware 106 of the expander system 102 includes) a request router 124 (ex.—a SMP request router) which is communicatively coupled to the request handlers (120, 122) and is configured for routing the requests (ex.—SMP requests) received from device(s) 108 to the request handlers (120, 122). In exemplary embodiments of the present disclosure, the expander system 102 further includes (ex.—the firmware 106 of the expander system 102 includes) a registered handler 126 (exs.—an interrupt handler; an Interrupt Service Routine (ISR)). The register handler 126 is configured for receiving and processing requests (ex.—SMP requests). For example, the register handler 126 is configured for checking a received SMP request, and based upon said checking, determining whether the received SMP request belongs (exs.—is directed to; should be routed to) the first SMP handler 122 or the second SMP handler 124. In further embodiments of the present disclosure, the register handler 126 is communicatively coupled to the SMP request router 124. In still further embodiments of the present disclosure, based upon said determining step described above, the register handler 126 is configured for causing the received SMP request to be selectively routed (via the SMP request router 124) to the first SMP handler 122 (ex.—the SMP handler 122 for the first virtual expander 116) or to the second SMP handler 124 (ex.—the SMP handler 124 for the second virtual expander 118).

In exemplary embodiments of the present disclosure, the expander system 102 is configured for maintaining a phy remapping table 128. The phy remapping table 128 indicates and/or tracks which of the physical phys 114 belong to which of the virtual expanders (116, 118). Further, the phy remapping table (ex.—phy remap table) 128 also indicates and/or tracks the logical phy mapping for each of the physical phys 114. For example, if the hardware component 104 of the expander system 102 has eight physical phys 114 (as shown in FIG. 1), and is presented as two virtual expanders (116, 118) (as shown in FIG. 1), the phy remap table 128 for said expander system 102 may be such as is shown in FIG. 2.

Figure 3:
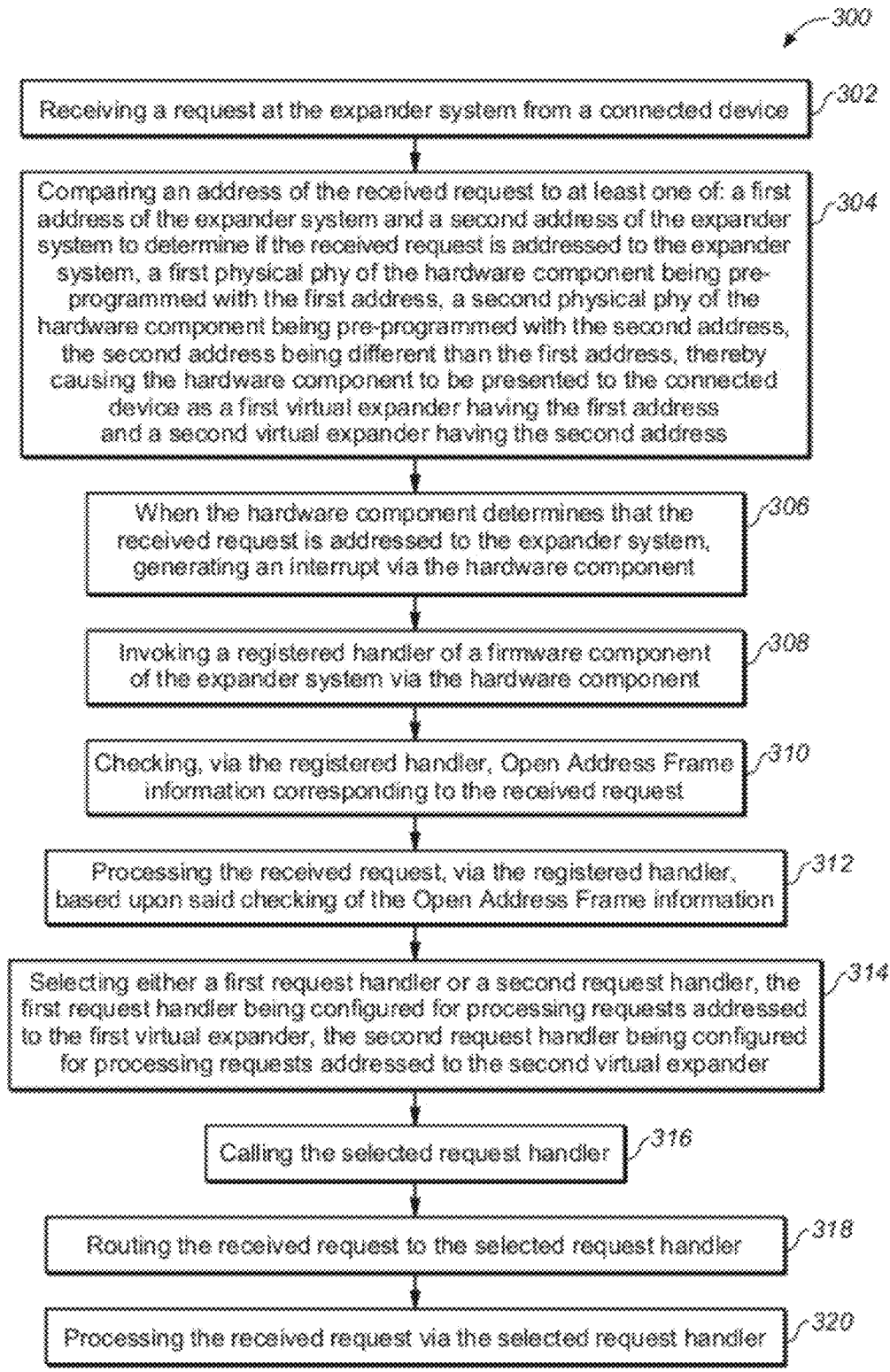
FIG. 3 is a flowchart illustrating a method for providing firmware-driven multiple virtual Serial Attached Small Computer Systems Interface (SAS) expanders on a single expander hardware component (exs.—via a single expander hardware component; on a single expander chip) via the expander system shown in FIG. 1, in accordance with exemplary embodiments of the present disclosure.

FIG. 3 is a flowchart which illustrates a method for providing firmware-driven multiple virtual Serial Attached Small Computer Systems Interface (SAS) expanders on a single expander hardware component (exs.—via a single expander hardware component; on a single expander chip) via the expander system 102 shown in FIG. 1, in accordance with exemplary embodiments of the present disclosure. The method 300 may include the step of receiving a request (ex.—a SMP request) at the expander system from a connected device 302. For example, upon seeing an SMP target, the connected device (ex.—HBA) 108 may transmit a SMP request (exs.—a REPORT GENERAL SMP request) to the expander system/expander 102 for starting the process of discovering the expander 102.

In further embodiments of the present disclosure, the method 300 further includes the step of comparing an address of the received request to addresses of the expander system, via the hardware component of the expander system, to determine if the received request is addressed to the expander system 304. For example, the received SMP request may include a destination SAS address. Further, the expander system 102 may include a plurality of SAS addresses. As mentioned above, the expander hardware component 104 includes a plurality of physical phys 114. Further, each of the physical phys 114 may include a plurality of registers (exs.—an IDENTIFY register set; IDENTIFY registers). Still further, registers (ex.—IDENTIFY registers) of a first portion (ex.—half) of the physical phys included in the plurality of physical phys 114 of the expander hardware component 104 may be programmed (ex.—pre-programmed) with a first address (ex.—SAS address "A"), while registers (ex.—IDENTIFY registers) of a second portion (ex.—the remaining half) of the physical phys included in the plurality of physical phys 114 of the expander hardware component 104 may be programmed (ex.—pre-programmed) with a second address (ex.—SAS address "B"), the second address being a different address than the first address. By programming the registers of the physical phys 114 of the expander hardware component with the two different addresses (ex.—SAS address "A" and SAS address "B"), the single hardware component 104 of the expander 102 may be presented as multiple expanders (ex.—two or more virtual expanders, such as virtual expander "A" having SAS address "A" and virtual expander "B" having SAS address "B") to the connected device 108.

During the above-referenced comparing step 304, the hardware component 104 of the expander system 102 may compare the destination SAS address of the received SMP request to the addresses (ex.—SAS address "A" and SAS address "B") of the expander system 102. Based upon said comparing, the hardware 104 of the expander system 102 determines if the SMP request is addressed to the expander system 102 or alternatively, if the SMP request needs to be forwarded (ex.—to a downstream connected device). How the hardware 104 makes said determination is dependent upon the design of the hardware 104. In an exemplary embodiment of the present disclosure, the hardware 104 may utilize a lookup table to make said determination. The lookup table may be a single lookup table for the expander hardware 104 and may be initialized by the firmware 106. The lookup table may provide an indication that received SMP requests which are addressed to (ex.—have as destination addresses) SAS address "A" or SAS address "B" are addressed to the expander system/expander 102. For instance, the lookup table may be configured with addresses of the expander system (ex.—SAS address "A" and SAS address "B").

In exemplary embodiments of the present disclosure, the method 300 further includes the step of, when the hardware component determines that the received request is addressed to the expander system, generating an interrupt (ex.—an SMP interrupt) via the hardware component 306. For instance, if said determination indicates that the received SMP request is addressed to any of the addresses of the expander system 102

(ex.—SAS address "A" or SAS address "B"), the hardware component 104 would generate an interrupt indicating to firmware 106 of the expander system 102 that an SMP request addressed to the expander system 102 has been received. In further embodiments, if the connected device 108 (ex.—HBA) is connected to a physical phy 114 having SAS address "A", the HBA 108 may send the request to SAS address "A", or if the HBA 108 is connected to a physical phy 114 having SAS address "B", the HBA 108 may send the request to SAS address "B". The HBA 108 would see different SMP targets depending upon which expander phy 114 it was connected to.

In further embodiments of the present disclosure, the method 300 further includes the step of (when the SMP interrupt is generated) invoking a registered handler of the expander system via the hardware of the expander system 308.

In exemplary embodiments of the present disclosure, the method 300 further includes the step of checking, via the registered handler, Open Address Frame (OAF) information corresponding to the received request 310. For example, the registered handler 126 of the expander system 102 may check a "Destination SAS Address" field of the OAF information to determine if the received request is addressed to the first virtual expander 116 of the expander system 102 (ex.—to determine if the received request is addressed to SAS address "A"), or if the received request is addressed to the second virtual expander 118 of the expander system 102 (ex.—to determine if the received request is addressed to SAS address "B"). In further embodiments, the registered handler 126 would be aware of both virtual expanders/virtual expander configurations (116, 118).

In further embodiments of the present disclosure, the method 300 further includes the step of processing the received request, via the registered handler, based upon said checking of the OAF information 312. In exemplary embodiments of the present disclosure, said processing of the received SMP request by the registered handler 126 may be performed in a variety of ways. For instance, a callback registration mechanism in the firmware 106, as described above, may be implemented. In embodiments in which a callback registration mechanism (as described herein) is implemented, said processing step 312 may further include the step of, based upon said checking of the OAF information, selecting either a first request handler (ex.—a first SMP handler) or a second request handler (ex.—a second SMP handler) 314. For example, the first SMP handler 120 may be configured for processing requests addressed to the first virtual expander 116, with the second SMP handler 122 being configured for processing requests addressed to the second virtual expander 118. In embodiments in which a callback registration mechanism (as described herein) is implemented, said processing step 312 may further include the step of calling the selected request handler 316. For instance, the registered handler 126 selects either the first SMP handler 120 (ex.—the first registered callback function) or the second SMP handler 122 (ex.—the second registered callback function) and calls the selected SMP handler/callback function. In embodiments in which a callback registration mechanism (as described herein) is implemented, said processing step 312 may further include the step of routing the received request to the selected request handler 318. For instance, the registered handler 126 may route the received request to the selected request handler (120 or 122) via a request router 124. In embodiments in which a callback registration mechanism (as described herein) is implemented, said method 300 may further include the step of processing the received request via the selected request handler 320.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium/computer-readable storage medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for providing firmware-driven multiple virtual expanders on a single expander hardware component via an expander system, said method comprising:

receiving a request at the expander system from a connected device;

comparing, via the hardware component, an address of the received request to at least one of: a first address of the expander system and a second address of the expander system to determine if the received request is addressed to the expander system, a first physical phy of the hardware component being pre-programmed with the first address, a second physical phy of the hardware component being pre-programmed with the second address, the second address being different than the first address, thereby causing the hardware component to be presented to the connected device as a first virtual expander having the first address and a second virtual expander having the second address;

when the hardware component determines that the received request is addressed to the expander system, generating an interrupt via the hardware component and invoking a registered handler of a firmware component of the expander system via the hardware component;

checking, via the registered handler, Open Address Frame information corresponding to the received request; and processing the received request, via the registered handler, based upon said checking of the Open Address Frame information, wherein said processing includes: selecting either a first request handler or a second request handler, the first request handler being configured for processing requests addressed to the first virtual expander, the second request handler being configured for processing requests addressed to the second virtual expander.

2. A method as claimed in claim 1, wherein said processing further includes: calling the selected request handler.

3. A method as claimed in claim 2, wherein said processing further includes:
routing the received request to the selected request handler.

4. A method as claimed in claim 3, further comprising:
processing the received request via the selected request handler.

5. A method as claimed in claim 1, wherein the connected device is one of: a Host Bus Adapter or a disk drive.

6. A method as claimed in claim 1, wherein the received request is a Serial Management Protocol request.

7. A method as claimed in claim 1, wherein the expander system is a Serial Attached Small Computer Systems Interface expander system.

8. A non-transitory, computer-readable medium having computer-executable instructions for performing a method for providing firmware-driven multiple virtual expanders on a single expander hardware component via an expander system, said method comprising:
receiving a request at the expander system from a connected device;
comparing, via the hardware component, an address of the received request to at least one of: a first address of the expander system and a second address of the expander system to determine if the received request is addressed to the expander system, a first physical phy of the hardware component being pre-programmed with the first address, a second physical phy of the hardware component being pre-programmed with the second address, the second address being different than the first address, thereby causing the hardware component to be presented to the connected device as a first virtual expander having the first address and a second virtual expander having the second address;
when the hardware component determines that the received request is addressed to the expander system, generating an interrupt via the hardware component and invoking a registered handler of a firmware component of the expander system via the hardware component;
checking, via the registered handler, Open Address Frame information corresponding to the received request; and
processing the received request, via the registered handler, based upon said checking of the Open Address Frame information, wherein said processing includes: selecting either a first request handler or a second request handler, the first request handler being configured for processing requests addressed to the first virtual expander, the second request handler being configured for processing requests addressed to the second virtual expander.

9. A non-transitory, computer-readable medium having computer-executable instructions for performing a method as claimed in claim 8, wherein said processing further includes: calling the selected request handler.

10. A non-transitory, computer-readable medium having computer-executable instructions for performing a method as claimed in claim 9, wherein said processing further includes: routing the received request to the selected request handler.

11. A non-transitory, computer-readable medium having computer-executable instructions for performing a method as claimed in claim 10, said method further comprising:
processing the received request via the selected request handler.

12. A non-transitory, computer-readable medium having computer-executable instructions for performing a method as claimed in claim 8, wherein the connected device is one of: a Host Bus Adapter or a disk drive.

13. A non-transitory, computer-readable medium having computer-executable instructions for performing a method as claimed in claim 8, wherein the received request is a Serial Management Protocol request.

14. A non-transitory, computer-readable medium having computer-executable instructions for performing a method as claimed in claim 8, wherein the expander system is a Serial Attached Small Computer Systems Interface expander system.

* * * * *